US012593102B2

(12) United States Patent
Tapse et al.

(10) Patent No.: US 12,593,102 B2
(45) Date of Patent: Mar. 31, 2026

(54) METHODS AND APPARATUS TO GENERATE REFERENCE SIGNATURES

(71) Applicant: The Nielsen Company (US), LLC, New York, NY (US)

(72) Inventors: Sandeep Tapse, Tampa, FL (US); Albert T. Borawski, Oldsmar, FL (US); Daniel Nelson, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 18/921,972

(22) Filed: Oct. 21, 2024

(65) Prior Publication Data

US 2025/0047937 A1     Feb. 6, 2025

Related U.S. Application Data

(63) Continuation of application No. 18/334,085, filed on Jun. 13, 2023, now Pat. No. 12,143,669, which is a continuation of application No. 17/833,565, filed on Jun. 6, 2022, now Pat. No. 11,716,510, which is a continuation of application No. 17/164,828, filed on Feb. 1, 2021, now Pat. No. 11,356,733, which is a continuation of application No. 16/180,992, filed on Nov. 5, 2018, now Pat. No. 10,911,824.

(51) Int. Cl.
| | |
|---|---|
| *H04N 21/442* | (2011.01) |
| *H04H 60/31* | (2008.01) |
| *H04H 60/56* | (2008.01) |

(52) U.S. Cl.
CPC ...... *H04N 21/44224* (2020.08); *H04H 60/31* (2013.01); *H04H 60/56* (2013.01); *H04N 21/44222* (2013.01)

(58) Field of Classification Search
CPC ....... H04N 21/44224; H04N 21/44222; H04N 21/23418; H04N 21/2353; H04N 21/26603; H04N 21/8352; H04N 21/44008; H04N 21/44204; H04N 21/44218; H04N 21/812; H04N 21/42201; H04N 21/44213; H04H 60/31; H04H 60/56; H04H 2201/90
USPC .................................................. 725/14, 9–12
See application file for complete search history.

(56) References Cited

U.S. PATENT DOCUMENTS

| | | | |
|---|---|---|---|
| 9,277,255 B1 * | 3/2016 | Rowe | ............... H04N 21/64322 |
| 2007/0106405 A1 * | 5/2007 | Cook | .................... G06F 16/634 |
| | | | 707/E17.101 |
| 2007/0124756 A1 | 5/2007 | Covell et al. | |

(Continued)

*Primary Examiner* — Cynthia M Fogg

(57) ABSTRACT

Methods and apparatus to generate reference signatures are disclosed. An example method includes collecting a first signature for media being presented to a plurality of households; crediting the media when the first signature matches a reference signature in a reference signature database; in response to determining that the first signature does not match a reference signature in the reference signature database and the first signature does not match an unidentified signature in an unknown signature database, storing the first signature in the unknown signature database; in response to determining that a second signature does not match the reference signature in the reference signature database and the second signature matches the unidentified signature in the unknown signature database, and increasing a count associated with the unidentified signature.

20 Claims, 9 Drawing Sheets

(56) References Cited

U.S. PATENT DOCUMENTS

| | | | |
|---|---|---|---|
| 2012/0095958 A1* | 4/2012 | Pereira | G06F 16/435 707/609 |
| 2014/0325555 A1* | 10/2014 | Khader | H04N 21/23424 725/32 |
| 2015/0254344 A1* | 9/2015 | Kulkarni | G06F 16/951 707/747 |
| 2016/0286266 A1* | 9/2016 | Moshitch | G06V 20/46 |

* cited by examiner

TO UNKNOWN SIGNATURE DATABASE 122

TO MEDIA SOURCE INTERFACE 112

TO REFERENCE DATABASE 118

TO PRELIMINARY SIGNATURE DATABASE 120

TO AUDIENCE MEASUREMENT INTERFACE 114

SIGNATURE GENERATOR 116

SIGNATURE COLLECTOR 204

COMMUNICATIONS INTERFACE 202

REPORT GENERATOR 212

SIGNATURE THRESHOLDER 206

SIGNATURE HANDLER 208

MEDIA CREDITOR 210

METHODS AND APPARATUS TO GENERATE REFERENCE SIGNATURES

CROSS-REFERENCE TO RELATED APPLICATIONS

The present disclosure is a continuation of U.S. patent application Ser. No. 18/334,085 (issued as U.S. Pat. No. 12,143,669), filed on Jun. 13, 2023, which is a continuation of U.S. patent application Ser. No. 17/833,565 (issued as U.S. Pat. No. 11,716,510), filed Jun. 6, 2022, which is a continuation of U.S. patent application Ser. No. 17/164,828 (issued as U.S. Pat. No. 11,356,733), which was filed Feb. 1, 2021, which is a continuation of U.S. patent application Ser. No. 16/180,992 (issued as U.S. Pat. No. 10,911,824), which was filed Nov. 5, 2018. U.S. patent application Ser. Nos. 18/334,085; 17/833,565; 17/164,828; and 16/180,992 are hereby incorporated herein in their entireties. Priority to U.S. patent application Ser. Nos. 18/334,085; 17/833,565; 17/164,828; and 16/180,992 is hereby claimed.

FIELD OF THE DISCLOSURE

This disclosure relates generally to media monitoring, and, more particularly, to methods and apparatus to generate reference signatures.

BACKGROUND

In recent years, over-the-top (OTT) media (e.g., YouTube® videos, Netflix® streaming, etc.) has become an increasingly popular source to receive media. OTT media is streaming media delivered over the Internet without a multiple-system operator being involved in the control and/or distribution of the media. As such, it is desirable to monitor the OTT media that is being consumed by individuals.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
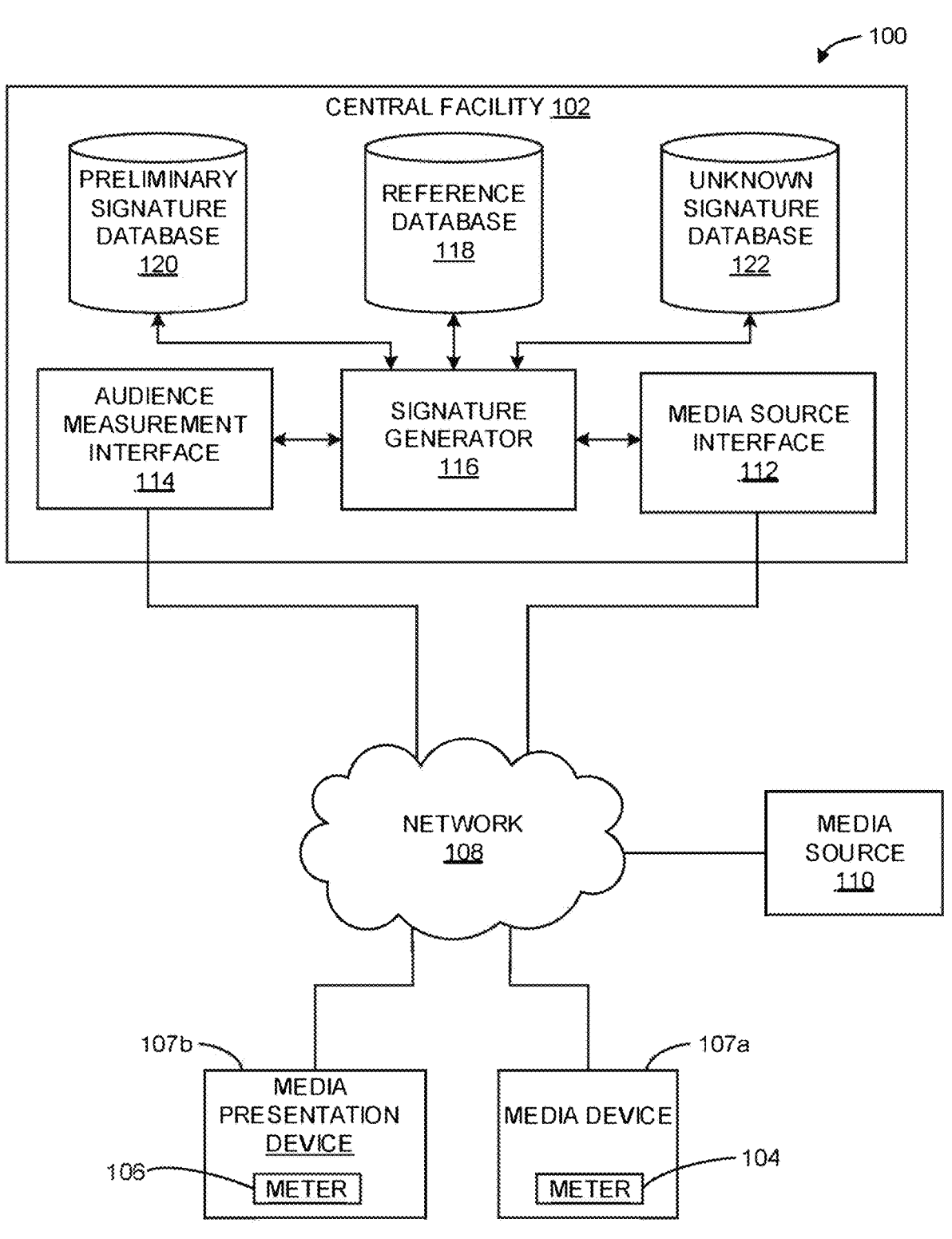
FIG. 1 is a schematic illustration of an example environment constructed in accordance with the teachings of this disclosure.

Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a timer interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

Examples disclosed herein are directed to generating reference signatures. For example, methods and apparatus disclosed herein may be used to collect preliminary signatures of media and then selectively approve the preliminary signatures for addition to a reference library for media that occurred more than a threshold amount. For example, popular sites like Hulu®, Netflix®, Amazon®, etc. may not provide media to an audience measurement entity prior to releasing the media for viewing. As such, the audience measurement entity is unable to generate reference signatures that can be matched with signatures collected by a meter located on/near a media device. Thus, when that media is viewed by a user on the media device, the audience measurement entity meter or an associated collection facility is unable to identify what media the user is watching because reference signatures have not been generated yet. In this scenario, later, when reference signatures are generated (e.g., 1 week later) the audience measurement entity has to re-process this data to determine the identity of the media. This is not desirable because the audience measurement entity may not be able to credit users as viewing that media for a number of days and re-processing is a time consuming costly process.

Examples disclosed herein provide improved apparatus and methods that generate signatures that are to be stored within a reference database for subsequent use in media monitoring conducted by the audience measurement entity. Examples disclosed herein collect preliminary signatures of media that is unknown (e.g., does not have a reference signature) and approves a preliminary signature for addition to a reference signature library when the preliminary signature is associated with identifying information and was received more than a threshold number of times (e.g., the preliminary signature was captured by 20 households). For example, a media source may stream a 40 min episode of a show that does not currently have a reference signature. The audience measurement entity may collect preliminary signatures for that episode from various households (HH), but is unable to identify the episode. As such, the audience measurement entity may store the preliminary signatures in a preliminary signature database to later be approved to be stored in a reference signature database, when the episode is identifiable (e.g., a database of unidentified signatures).

As used herein, "media" may include advertising and/or content. Example types of media include web pages, text, images, streaming video, streaming audio, movies, and/or any other type of content and/or advertisements. In some examples, media includes user-generated media that is, for example, uploaded to media upload sites such as Youtube® and subsequently downloaded and/or streamed by one or more client devices for playback. Media may also include advertisements. Advertisements are typically distributed with content (e.g., programming). Traditionally, content is provided at little or no cost to the audience because it is subsidized by advertisers that pay to have their advertisements distributed with the content. As used herein, "media" refers collectively and/or individually to content and/or advertisement(s) of any type(s).

FIG. 1 is a schematic illustration of an example environment 100 constructed in accordance with the teachings of this disclosure to generate reference signatures. The illustrated example includes an example central facility 102 to receive media monitoring information (e.g., signatures, uniform resource locators (URLs), media titles, etc.) from example meters 104, 106 regarding media (e.g., advertisements, over-the-top (OTT) media, etc.) presented by one or more media devices 107*a-b*. The example central facility 102 is communicatively coupled to the example meters 104, 106 via an example network 108. In some examples, the meters 104, 106 are on-site meters that collect and/or generate signatures of detected audio from the media being consumed by the media devices 107*a-b*. In such an example, the signatures collected and/or generated by the meters 104, 106 are transmitted to the central facility 102 via a network 108 for processing. In other examples, the meters 104, 106 are personal portable meters (PPM) that generate signatures of detected audio and/or video. In some examples, the meter 104 is a first type of meter (e.g., a global television audience meter (GTAM)), and the meter 106 is a second type of meter (e.g., a Netsite meter). In some examples, the meter 106 (e.g., a Netsite meter) is capable of producing media monitoring information that includes metadata (e.g., media identifying information).

The illustrated example environment 100 further includes a media source 110 that transmits media (e.g., OTT media, television programs, etc.) to media presentation devices. For example, the media source 110 can be an OTT provider (e.g., Hulu®, Netflix®, etc.), a television broadcast network (e.g., NBC, CBS, etc.), and/or other providers of media over the example network 108. In some examples, media transmitted by the example media source 110 is detected by the example meters 104, 106. Although the illustrated example of FIG. 1 includes a single example media source 110, some other examples include multiple media sources communicatively coupled to the example central facility 102 and/or provided to the media presentation devices via the example network 108.

The media provided by the example media source 110 is additionally transmitted to the example central facility 102. The central facility 102 receives the media at an example media source interface 112. In the illustrated example, the example central facility 102 includes an example signature generator 116, which generates reference signatures for the media received at the example audience measurement interface 114. The example signature generator 116 stores the generated signatures in an example reference database 118. In some examples, the signature generator 116 stores other information associated with the media element (e.g., a title of the media content, an identifier associated with the media content, etc.) with the generated signature. The signatures in the example reference database 118 can be used to match signatures received at the audience measurement interface 114 from the example meters 104, 106. When a signature received from one of the example meters 104, 106 matches a signature stored in the example reference database 118, the media associated with the signature is credited as being viewed. For example, the meter 106 collects and/or generates a signature for a piece of media (e.g., a Youtube® video, an episode streaming through Netflix®, etc.), and transmits the collected and/or generated signature to the central facility 102 via the network 108. In such an example, the signature generator 116 compares the collected and/or generated signature to one or more signatures stored in the reference database 118, and, when a signature stored in the reference database 118 matches the collected and/or generated signatures, credits the media in the reference database 118.

The example signature generator 116 thus determines preliminary signatures for the OTT media provided by the example media source 110. As used herein, the term "preliminary signature" refers to a signature collected and/or generated for a portion of media. In some examples, preliminary signatures are signatures generated for thirty minutes of the media. In some other examples, the signatures are generated for longer or shorter portions of the media. In some examples, the preliminary signatures are generated from multiple portions of the media (e.g., a portion at the beginning and a portion at the end of the media, etc.).

The preliminary signatures generated by the example signature generator 116 are stored in an example preliminary signature database 120. In some examples, the preliminary signatures stored in the example preliminary signature database 120 are associated with the media from which they were generated. The example preliminary signature database 120 further includes other information associated with the media (e.g., a title of the media, ID associated with the media, etc.).

The example signature generator 116 can also determine unknown signatures for the OTT media provided by the example media source 110. As used herein, the term "unknown signature" refers to a signature collected and/or generated for a portion of media that does not include media identifying information (e.g., a title of the media, ID associated with the media, etc.). In some examples, unknown signatures are signatures generated for thirty minutes of the media. In some other examples, the signatures are generated for longer or shorter portions of the media. In some examples, the unknown signatures are generated from multiple portions of the media (e.g., a portion at the beginning and a portion at the end of the media, etc.).

The unknown signatures generated by the example signature generator 116 are stored in an example unknown signature database 122. In some examples, the unknown signatures stored in the example unknown signature database 122 are associated with the media from which they were generated. The example unknown signature database 122 does not include other information associated with the media (e.g., a title of the media, ID associated with the media, etc.).

When either of the example meters 104, 106 collect and/or generate a signature and transmit the signature to the example central facility 102, the signature generator 116 compares the signature to the reference signatures stored in the reference database 118, the preliminary signatures stored in the example preliminary signature database 120 and/or the unknown signatures stored in the example unknown signature database 122. In some examples, when the signature is an unknown signature, the signature generator 116 may first compare the signature to the reference signatures in the reference database 118 and then to the unknown signatures in the unknown signature database 122. As such, processing cycles are decreased because the unknown signatures do not have to be compared to any preliminary signatures in the preliminary signature database 120. If a match is detected, the example signature generator 116 increases and/or adds a count with the media of the preliminary signature or the unknown signature. As used herein, the term "count" refers to a match between a signature collected and/or generated by a metering device (e.g., the meters 104, 106) and a preliminary signature stored in the example preliminary signature database 120 and/or an unknown signature stored in the example unknown signature database 122. For example, a count may correspond to a panelist viewing media on a monitored device. Thus, the more counts that are associated with a media element, the more it has been viewed.

In some examples, the example reference database 118 stores monitoring information used to generate reports. For example, the reference database 118 stores media and an associated number of counts indicative of crediting the media and/or other monitoring information (e.g., demographic information associated with the counts of the media, characteristics associated with panelists, etc.). In some examples, a report is generated based on the media and/or information stored in the reference database 118 and subsequently provided to a media source (e.g., the example media source 110) and/or another interested party. In other examples, another database can be utilized to store the information for generating reports.

While an example manner of implementing the meters 104, 106 of FIG. 1 is illustrated in FIG. 1, one or more of the elements, processes and/or devices illustrated in FIG. 1 may be combined, divided, re-arranged, omitted, eliminated and/or implemented in any other way. Further, the example meters 104, 106 of FIG. 1 may be implemented by hardware, software, firmware and/or any combination of hardware, software and/or firmware. Thus, for example, any of the example meters 104, 106 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example meters 104, 106 of FIG. 1 is/are hereby expressly defined to include a non-transitory computer readable storage device or storage disk such as a memory, a digital versatile disk (DVD), a compact disk (CD), a Blu-ray disk, etc. including the software and/or firmware. Further still, the example meters 104, 106 of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 2:
FIG. 2 is a block diagram of an example implementation of the example signature generator of FIG. 1.

FIG. 2 is a block diagram of an example implementation of the example signature generator 116 of FIG. 1. The example signature generator 116 includes an example communications interface 202, an example signature collector 204, an example signature thresholder 206, an example signature handler 208, an example media creditor 210, and an example report generator 212.

In the illustrated example, the communications interface 202 receives generated and/or collected signatures from the example meters 104, 106 via the example media source interface 112. For example, the meters 104, 106 of FIG. 1 are communicatively coupled to the media source interface 112 via the network 108 of FIG. 1. The signatures generated and/or collected by the meters 104, 106 of FIG. 1 are thus delivered to the signature generator 116 for processing at the example central facility 102 via the communications interface 202. The example communications interface 202 is utilized to communicate with the example media source interface 112, the example audience measurement interface 114, the example reference database 118, the example preliminary signature database 120, and/or the example unknown signature database 122. In some examples, the signature generator 116 may be in direct communication with the meters 104, 106 via the network 108 and collect the signatures from the example meters 104, 106 via the communications interface 202 without communicating with the media source interface 112.

In the illustrated example, the signature collector 204 collects the signatures from the meters 104, 106 for which reference signatures are to be generated. The example signature collector 204 determines which signatures accessed via the communications interface 202 are to be added to the preliminary signature database 120 and/or the unknown signature database 122 of FIG. 1. For example, the signature collector 204 determines that a signature is to be added to either the preliminary signature database 120 or the unknown signature database 122 based on a type of the signature. For example, the example signature collector 204 signature collector 204 may collect a first type of signature (e.g., a signature that does not include metadata) from the meter 104 (e.g., a GTAM) and a second type of signature (e.g., a signature that does include metadata) from the meter 106 (e.g., a Netsite meter). As such, the signature collector 204 may determine that the first type of signature (e.g., does not include metadata) is to be subsequently compared to the reference signatures in the reference database 118 and the unknown signatures in the unknown signature database 122 by the signature thresholder 206. In some examples, the signature collector 204 may generate signatures for media from the media source 110 (e.g., a website that hosts OTT media (e.g., Youtube®, Hulu®, etc.)). For example, the signature collector 204 may generate a signature for media from the media source 110 that is to be processed by the signature generator 116.

The example signature thresholder 206 determines whether the signatures from the signature collector 204, match any signatures in the reference database 118, the preliminary signature database 120 and/or the unknown signature database 122. In some examples, when the signature collector 204 identifies a signature as the first type of signature, the signature thresholder 206 compares the signature to the reference signatures in the reference database 118 and the unknown signatures in the unknown signature database 122.

The example signature thresholder 206 queries the example reference database 118 to determine if a signature matches a reference signature stored in the reference database 118. If the example signature thresholder 206 determines a match between a received signature and a signature stored within the reference database 118, the signature thresholder 206 sends the determination (e.g., an indication that a signature matches a reference signature) to the example media creditor 210 to credit the media associated with the signature stored in the reference database 118. If the example signature thresholder 206 determines the signature of the received media does not match any of the signatures stored in the example reference database 118, the example signature thresholder 206 queries the preliminary signature database 120.

When the example signature thresholder 206 determines that the received signature matches a signature in the example preliminary signature database 120, the example signature thresholder 206 increases a count associated with the media stored in the preliminary signature database 120 (e.g., by associating the count with a media title, ID, URL, etc.). The example signature thresholder 206 continues to add to the number of counts associated with the media as more signatures are received that match preliminary signatures within the preliminary signature database 120. In some examples, when the received signature includes metadata (e.g., media identifying information) and does not match a reference signature in the reference database 118 or a preliminary signature in the preliminary signature database 120, the example signature thresholder 206 sends the signature to the signature handler 208. The signature handler 208 stores a preliminary signature (e.g., associates the signature with the metadata) which is subsequently stored in the preliminary signature database 120 for further processing.

When a match is not detected by the example signature thresholder 206 in either the reference database 118 or the preliminary signature database 120, and the signature does not include metadata, the example signature thresholder 206 queries the unknown signature database 122 to determine if the received signature matches an unknown signature stored in the unknown signature database 122. When the example signature thresholder 206 determines that the received signature matches a signature in the example unknown signature database 122, the example signature thresholder 206 increases a count associated with the unknown signature stored in the unknown signature database 122. The example signature thresholder 206 continues to add to the number of counts associated with the unknown signature as more signatures are received that match unknown signatures within the unknown signature database 122.

When a match is not detected by the example signature thresholder 206 in either the reference database 118, the preliminary signature database 120 and/or the example unknown signature database 122, the example signature thresholder 206 sends the signature to the signature handler 208. The signature handler 208 stores an unknown signature with an identifier (e.g., Unknown1234) which is subsequently stored in the unknown signature database 122 for further processing. In some examples, the unknown signature is stored for a particular percentage of the media (e.g., 75% of the media, etc.) because the viewer may have only viewed 75% of the media. As such, the signature thresholder 206 may receive signatures that include more than a particular percentage of the media (e.g., 92% of the media) following the storage of the unknown signature. Thus, the example signature thresholder 206 may increase a count associated with the unknown signature and the signature handler 208 can expand the unknown signature to include the updated portions of the signature to increase the effectiveness of identifying a signature match.

In the illustrated example, the example signature thresholder 206 selects a preliminary signature from the example preliminary signature database 120 to be analyzed. The process of selecting preliminary signatures in the preliminary signature database 120 to be analyzed can occur before, during, and after the generation of preliminary signature. That is, the preliminary signature may be analyzed prior to generating the preliminary signature to reduce memory requirements and reduce processing cycles. For example, the example signature thresholder 206 compares the counts associated with the selected preliminary signature stored in the preliminary signature database 120 to a count threshold (e.g., 20, 30, 40, 110, etc.) to determine if a reference signature is to be generated for the preliminary signature. In some examples, the threshold is determined as a required count number. In some such examples, the required count may be determined by a user or administrator. If the count meets the threshold, the signature handler 208 generates a reference signature for the preliminary signature, and the media creditor 210 credits the media as being viewed an amount associated with the count.

If the example signature thresholder 206 determines that the count associated with the preliminary signature does not meet the threshold, the example signature thresholder 206 can query the unknown signature database 122 to determine if the preliminary signature matches an unknown signature in the unknown signature database 122. If a match is found, the example signature thresholder 206 can increase the count associated with the preliminary signature by the count associated with the unknown signature. The example signature thresholder 206 then determines whether the number of counts associated with the selected preliminary signature meets a threshold. If the total count of the combination of the preliminary signature and the unknown signature satisfies the threshold, the signature thresholder 206 associates the preliminary signature with the unknown signature. The example signature handler 208 subsequently removes the preliminary signature from the preliminary signature database 120, and removes the unknown signature from the unknown signature database 122. The example signature handler 208 stores a reference signature for the preliminary signature and the unknown signature by associating the signature with the metadata from the preliminary signature. The signature handler 208 stores the reference signature in the reference database 118, and sends an indication to the media creditor 210.

The example media creditor 210 receives indications from the signature thresholder 206 regarding whether a count has been increased for a reference signature and/or whether a signature has been stored as a reference signature in the reference database 118. When the example signature handler 208 stores a reference signature in the reference database (e.g., the signature handler 208 determines a combination of preliminary signatures and unknown signatures meets a threshold), the example media creditor 210 determines the media from the reference signature and credits the media as being viewed an amount associated with the total count between the preliminary signature and the unknown signature when a reference signature is stored in the reference database 118. As such, the unknown signatures do not need to be re-processed once identifying information (e.g., metadata) is received. The crediting is recorded and associated with the media stored in the reference database 118 in addition to other information associated with the media (e.g., a title of the media, a URL of the media, a unique ID associated with the media, etc.). The media creditor 210 of the illustrated example continues to add to the number of credits each time a new match is detected. Alternatively, the example media creditor 210 may keep track of individual views of a signature and credit the views once the signature is known (e.g., has a reference signature).

The example report generator 212 generates a report identifying the media and the crediting information (e.g., count associated with signature) determined during processing. The example report generator 212 may also receive other monitoring information (e.g., demographic information associated with the media, characteristics associated with panelist, etc.) from the audience measurement interface 114. The report generated by the report generator 212 may subsequently be provided to a media source (e.g., the media source 110) and/or another interested party. In some examples, the report generator 212 may display the report on a device via a webpage in a first state with a set of options. The example set of options may be selectable by a user to change the state of the display to view different types of information in the report.

While an example manner of implementing the signature generator 116 of FIG. 1 is illustrated in FIG. 2, one or more of the elements, processes and/or devices illustrated in FIG. 2 may be combined, divided, re-arranged, omitted, eliminated and/or implemented in any other way. Further, the example communications interface 202, the example signature collector 204, the example signature thresholder 206, the example signature handler 208, the example media creditor 210, the example report generator 212 and/or, more generally, the example signature generator 116 of FIG. 2 may be implemented by hardware, software, firmware and/or any combination of hardware, software and/or firmware. Thus, for example, any of the example the example communications interface 202, the example signature collector 204, the example signature thresholder 206, the example signature handler 208, the example media creditor 210, the example report generator 212 and/or, more generally, the example signature generator 116 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, the example communications interface 202, the example signature collector 204, the example signature thresholder 206, the example signature handler 208, the example media creditor 210, the example report generator 212 and/or, more generally, the example signature generator 116 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example signature generator 116 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
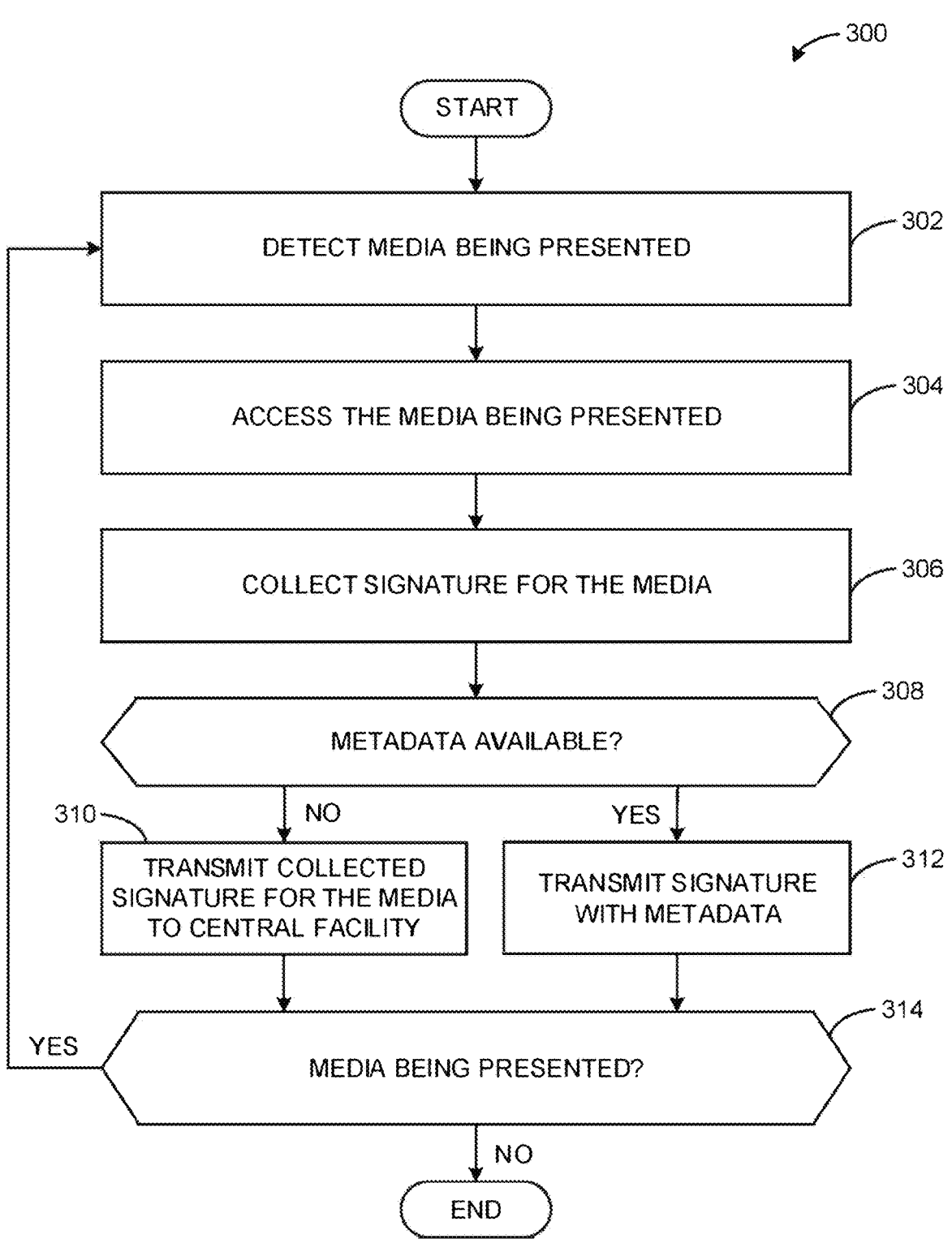
FIG. 3 is an example flowchart representative of machine readable instructions which may be executed to implement the meter of FIG. 1.

A flowchart representative of example hardware logic, machine readable instructions, hardware implemented state machines, and/or any combination thereof for implementing the example meters 104, 106 of FIG. 1 is shown in FIG. 3. The machine readable instructions may be an executable program or portion of an executable program for execution by a computer processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 3, many other methods of implementing the example meters 104, 106 of FIG. 1 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 3 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

FIG. 3 is a flowchart representative of machine readable instructions which may be executed to implement the example meters 104, 106 of FIG. 1. The example program 300 of FIG. 3 begins at block 302 where the meter 104, 106 detects media being presented. For example, the media source 110 may be presenting media to a presentation device that either one of the meters 104, 106 is associated with. At block 304, the meter 104, 106 accesses the media being presented. At block 306, the meter 104, 106 collects a signature for the media. For example, the meter 104, 106 may utilize any known algorithm or process for collecting and/or generating a signature for the media. At block 308, the meter determines if metadata is available. If the meter 104, 106 determines that no metadata is available, the meter 104, 106 transmits the collected signature for the media to the central facility 102 (block 310). For example, the meter 104, 106 may transmit the signature to the central facility 102 via the audience measurement interface 114 and/or the signature generator 116. If the meter 104, 106 determines that metadata is available, the meter 104, 106 transmits the signature with the metadata (block 312). At block 314, the meter 104, 106 determines if media is being presented. If the meter 104, 106 determines media is being presented, the program 300 returns to block 302. If the meter 104, 106 determines media is not being presented, the program 300 ends.

Flowcharts representative of example hardware logic, machine readable instructions, hardware implemented state machines, and/or any combination thereof for implementing the signature generator 116 are shown in FIGS. 4-8. The machine readable instructions may be an executable program or portion of an executable program for execution by a computer processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowcharts illustrated in FIGS. 4-8, many other methods of implementing the example signature generator 116 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 3-8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

Figure 4:
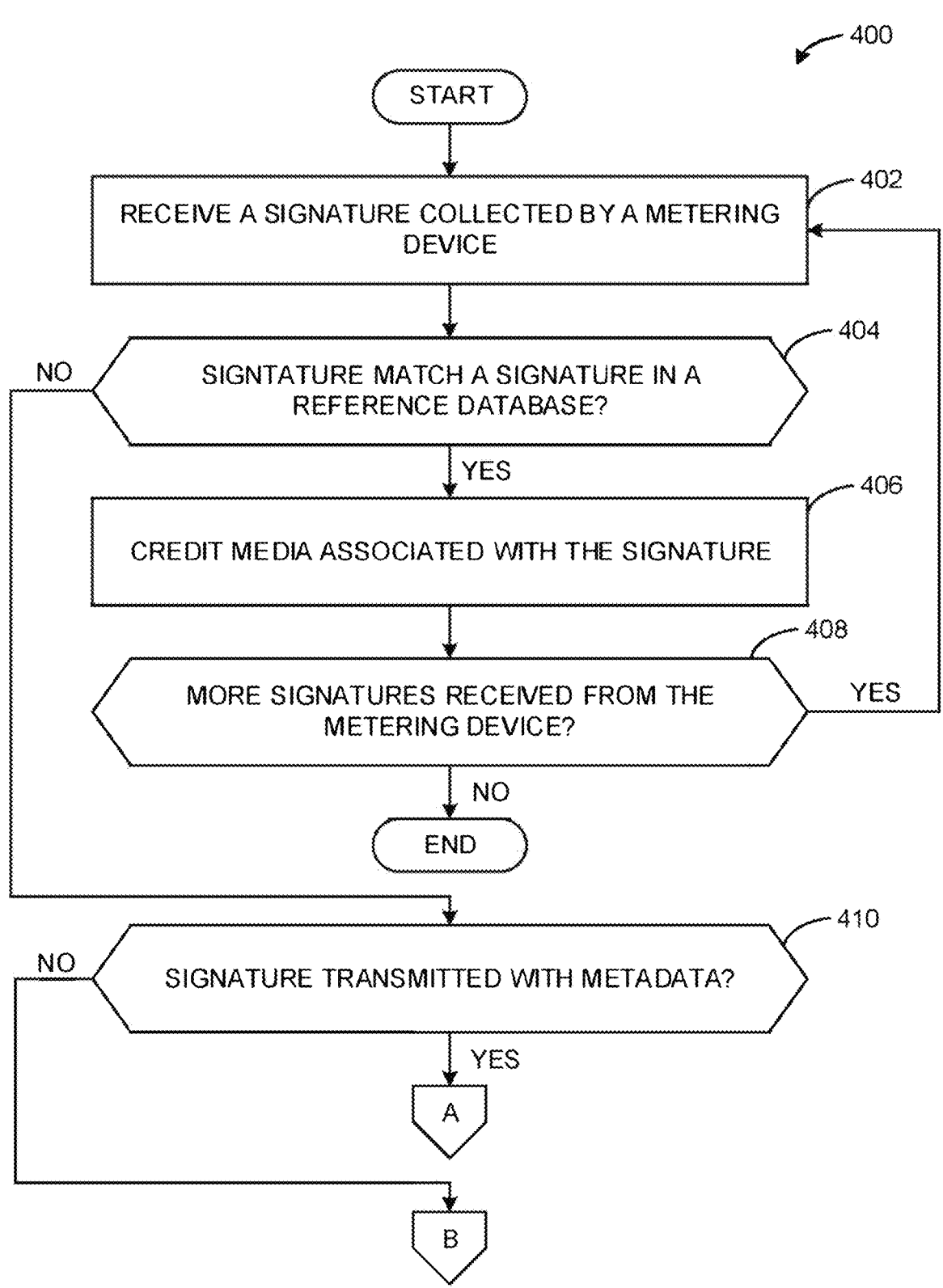
FIGS. 4-8 are example flowcharts representative of machine readable instructions which may be executed to implement the signature generator of FIGS. 1-2.

FIG. 4 is a flowchart representative of machine readable instructions which may be executed to implement the example signature generator 116 of FIGS. 1-2. The example program 400 begins when the example signature collector 204 receives a signature collected by a metering device (block 402). For example, the signature collector 204 may receive a signature that was collected and/or generated by the meter 104, 106. At block 404, the signature thresholder 206 determines if the signature matches a signature in a reference database. For example, the signature thresholder 206 determines if the signature matches a reference signature in the reference database 118. If the signature thresholder 206 determines that the signature matches a reference signature in the reference database 118, the media creditor 210 credits media associated with the reference signature. At block 408, the signature collector 204 determines if more signature have been received from the metering device. If more signature have been received, the program 400 returns to block 402. If the signature collector 204 determines that no more signatures have been received from the metering device, the program 400 ends. However, if at block 404, the signature thresholder 206 determines that the signature does not match a reference signature in the reference database 118, the signature thresholder 206 determines if the signature was transmitted with metadata (block 410). If the signature thresholder 206 determines that the signature was transmitted with metadata, the program 400 proceeds to block A If the signature thresholder 206 determines that the signature was not transmitted with metadata, the program 400 proceeds to block B.

Figure 5:
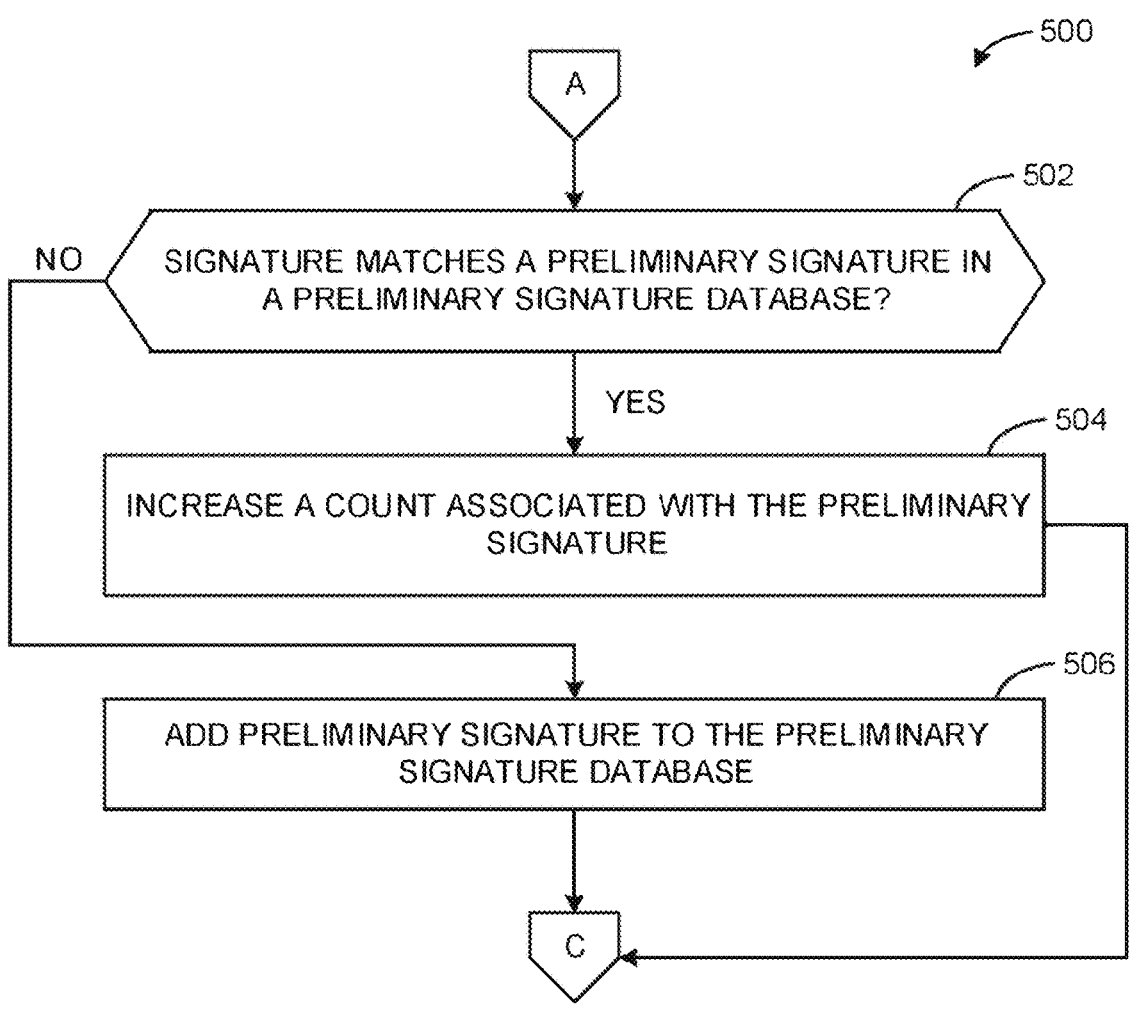

FIG. 5 is a flowchart representative of machine readable instructions which may be executed to implement the example signature generator 116 of FIGS. 1-2. The example program 500 begins at block 502 where the signature thresholder 206 determines if the signature matches a preliminary signature in a preliminary signature database. For example, the signature thresholder 206 determines if the signature matches a preliminary signature in the preliminary signature database 120. If the signature thresholder 206 determines that the signatures matches a preliminary signature, the signature thresholder 206 increases a count associated with the preliminary signature (block 604). The program 500 then proceeds to block C. If the signature thresholder 206 determines that the signatures does not match a preliminary signature, the signature handler 208 adds the preliminary signature to the preliminary signature database 120 (block 506). In some examples, the signature thresholder 206 can add the preliminary signature to the preliminary signature database 120. The program 500 then proceeds to block C.

Figure 6:
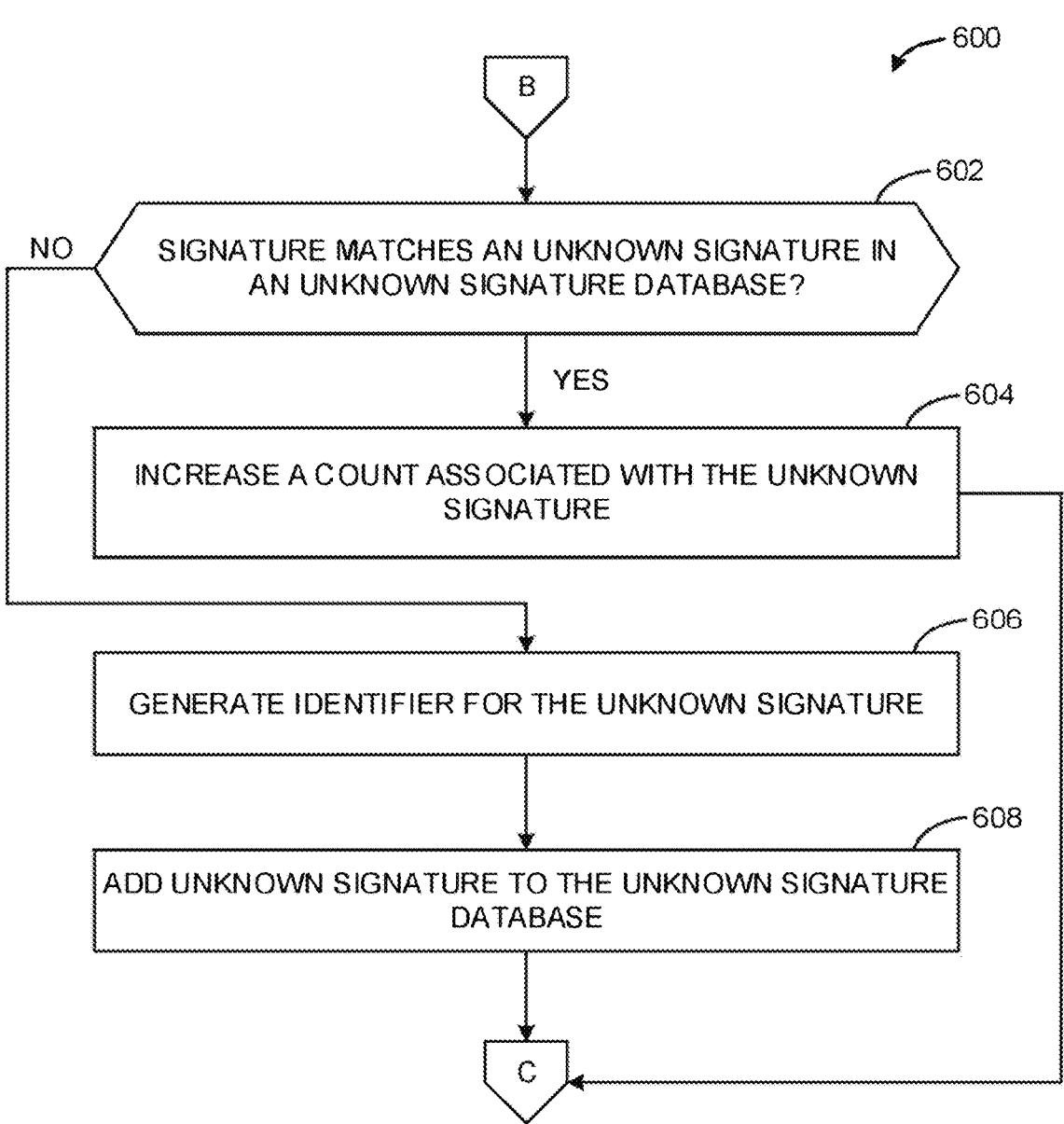

FIG. 6 is a flowchart representative of machine readable instructions which may be executed to implement the signature generator 116 of FIGS. 1-2. The example program 600 begins at block 602 where the signature thresholder 206 determines if the signature matches an unknown signature in an unknown signature database. For example, the signature thresholder 206 determines if the signature matches an unknown signature in the unknown signature database 122. If the signature thresholder 206 determines that the signature matches an unknown signature in the unknown signature database 122, the signature thresholder 206 increases a count associated with the unknown signature (block 604). The program 600 then proceeds to block C. If the signature thresholder 206 determines that the signature does not match an unknown signature in the unknown signature database 122, the signature thresholder 206 generates an identifier for the unknown signature (block 606). For example, the signature thresholder 206 may generate the identifier "Unknown1234" for the signature. The signature thresholder 206 adds the unknown signature and the identifier to the unknown signature database 122 (block 608). In some examples, the signature handler 208 may generate the identifier and add the unknown signature to the unknown signature database 122. The program 600 then proceeds to block C.

Figure 7:
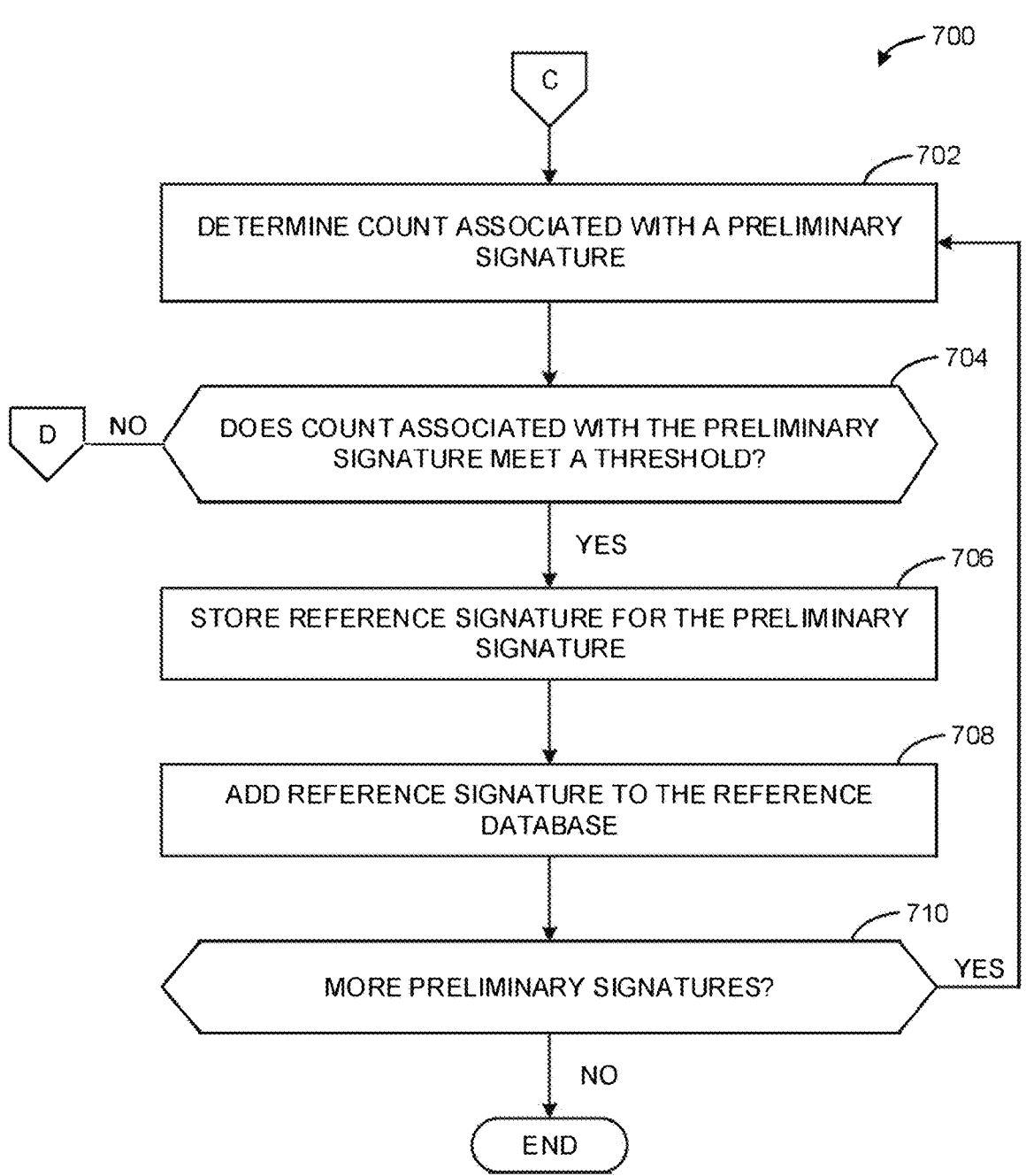

FIG. 7 is a flowchart representative of machine readable instructions which may be executed to implement the example signature generator 116 of FIGS. 1-2. The example program 700 begins at block 702 where the signature thresholder 206 determines a count associated with a preliminary signature. For example, the signature thresholder 206 determines that count associated with how many times the preliminary signature has matched with a received signature received from the meters 104, 106. At block 704, the signature thresholder 206 determines if the count associated with the preliminary signature meets a threshold. For example, the signature thresholder 206 determines if the count satisfies a count threshold (e.g., 20, 30, 110, 200, etc.). If the signature thresholder 206 determines that the count does not satisfy the threshold, the program 700 proceeds to block D. If the signature thresholder 206 determines that the count does meet the threshold, the signature handler 208 stores a reference signature for the preliminary signature (block 706). At block 708, the signature handler 208 adds the reference signature to the reference database 118. The signature thresholder 206 then determines if there are more preliminary signatures (block 710). If the signature thresholder 206 determines there are more preliminary signature, the program 700 returns to block 702. If the signature thresholder 206 determines there are no more preliminary signatures, the program 700 ends.

Figure 8:
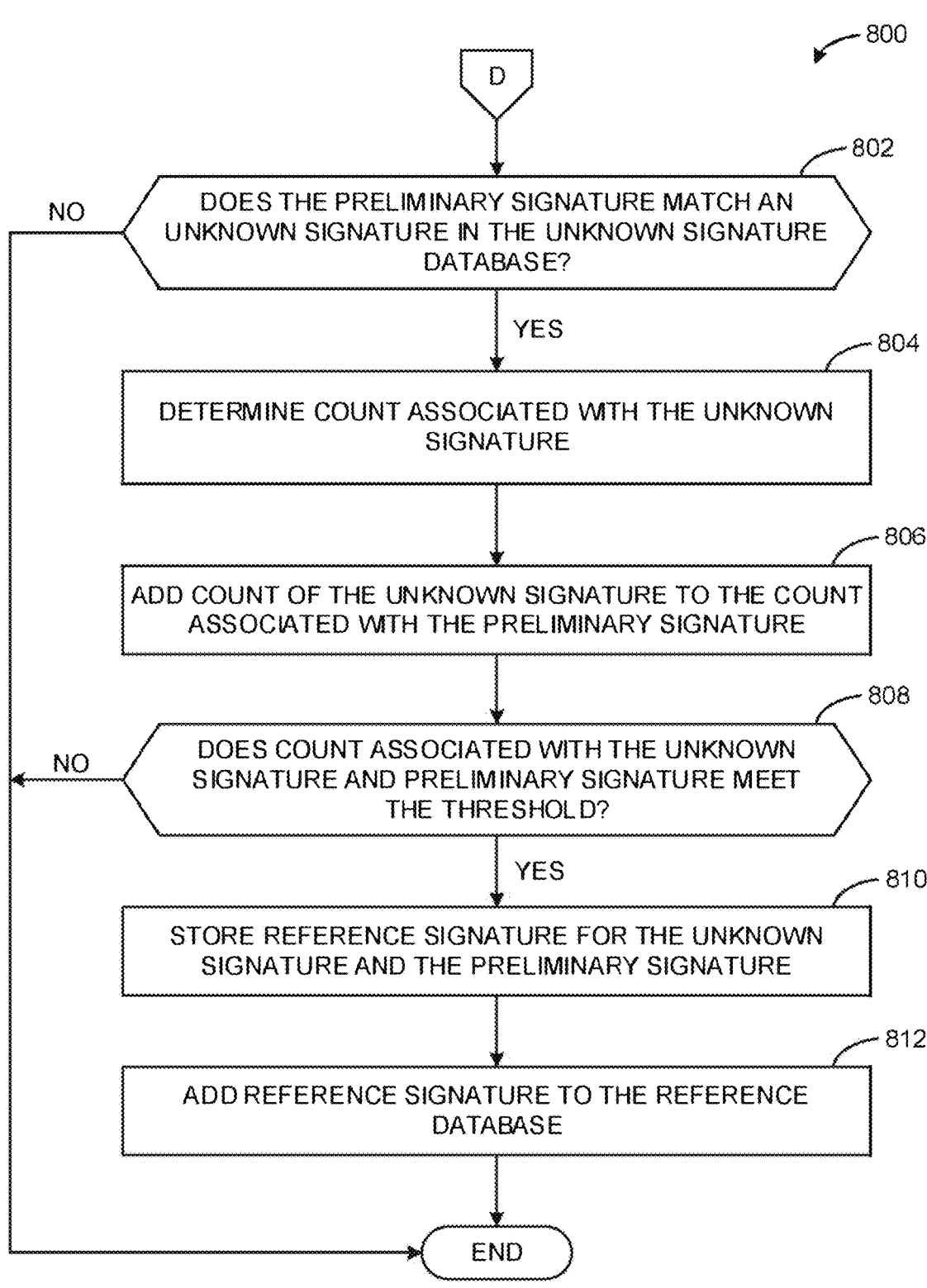

FIG. 8 is a flowchart representative of machine readable instructions which may be executed to implement the example signature generator 116 of FIGS. 1-2. The example program 800 begins at block 802 where the signature thresholder 206 determines if the preliminary signature matches an unknown signature in the unknown signature database 122. If the signature thresholder 206 determines that the preliminary signature does not match an unknown signature in the unknown signature database 122, the program 800 ends. If the signature thresholder 206 does determine a match between the preliminary signature and an unknown signature in the unknown signature database 122, the signature thresholder 206 determines a count associated with the unknown signature (block 804). At block 806, the signature thresholder 206 adds the count of the unknown signature to the count associated with the preliminary signature. For example, the signature thresholder 206 determines the count associated with how many times the unknown signature and the preliminary signature have received a match from a received signature. At block 808, the signature thresholder 206 determines if the count associated with the preliminary signature and the unknown signature meets a threshold. For example, the signature thresholder 206 determines if the count satisfies a count threshold (e.g., 20, 30, 110, 200, etc.). If the signature thresholder 206 determines that the count does not satisfy the threshold, the program 800 ends. If the signature thresholder 206 determines that the count does meet the threshold, the signature handler 208 stores a reference signature for the preliminary signature (block 810). At block 812, the signature handler 208 adds the reference signature to the reference database 118. The program 800 ends.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with Band with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 9:
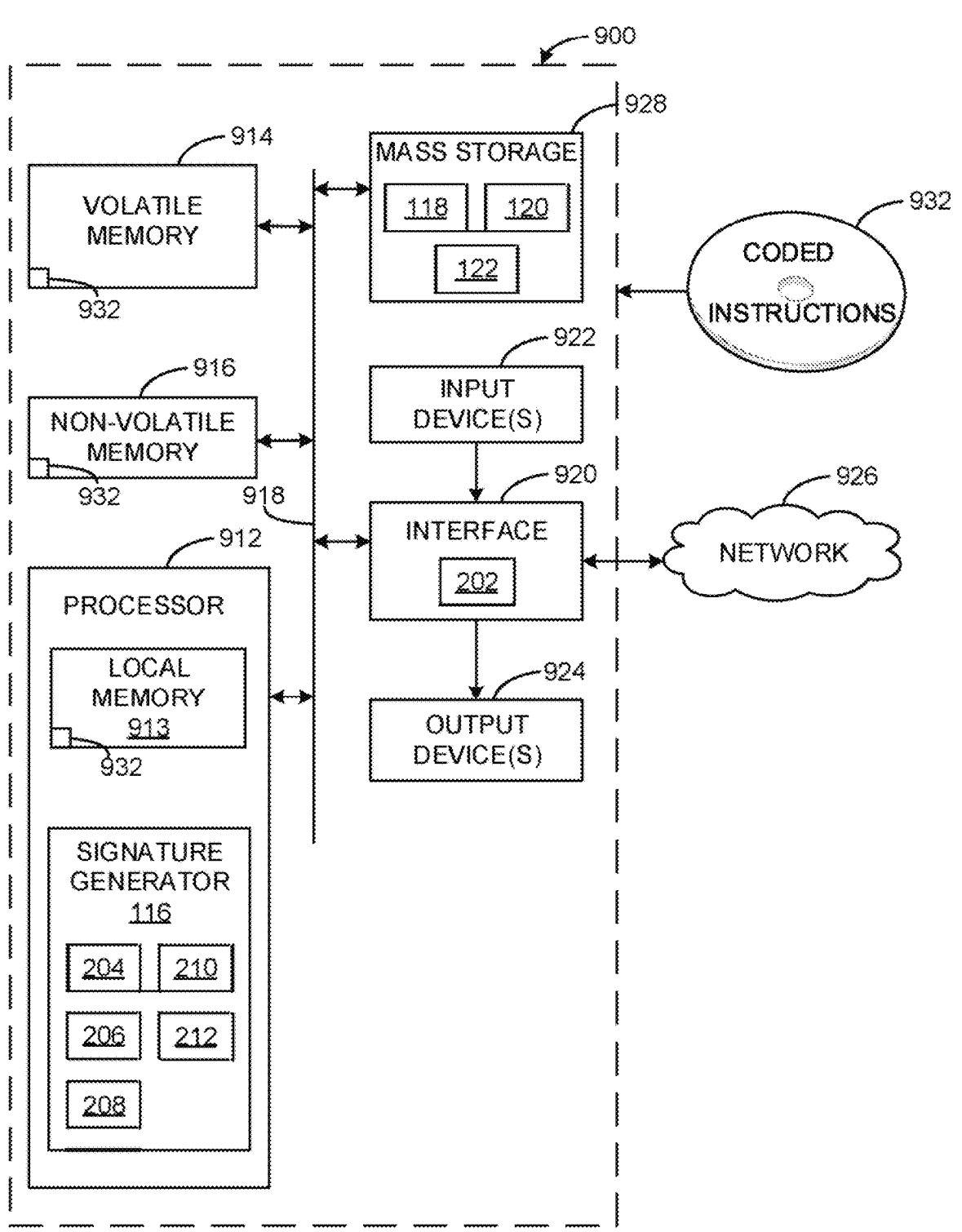
FIG. 9 is a block diagram of an example processing platform structured to execute the instructions of FIGS. 3-8 to implement the example meters of FIG. 1 and/or the example signature generator of FIGS. 1-2.

FIG. 9 is a block diagram of an example processor platform 900 structured to execute the instructions of FIGS. 4-8 to implement the signature generator 116 of FIGS. 1-2. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example communications interface 202, the example signature collector 204, the example signature thresholder 206, the example signature handler 208, the example media creditor 210, the example report generator 212 and/or, more generally, the example signature generator 116 of FIG. 2.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIGS. 4-8 may be stored in the mass storage device 928, in the volatile memory 914, in the non-volatile memory 916, and/or on a removable non-transitory computer readable storage medium such as a CD or DVD.

From the foregoing, it will be appreciated that example methods, apparatus and articles of manufacture have been disclosed that improve the operating efficiency of computing devices by generating reference signatures based on preliminary and unknown signatures to avoid re-processing such signatures. Such disclosed examples increase the computational efficiency of monitoring media (e.g., by determining numbers of views based on preliminary signatures and unknown signatures prior to receiving metadata) by reducing the amount of processing cycles required to re-process unknown and preliminary signatures. In some examples disclosed herein, reference signatures are only generated for certain preliminary signatures that meet particular criteria, which further reduces the storage requirements of an example central facility. Further, the disclosed methods increase the validating of data for making a reference signature by using the unlabeled unknown signatures as part of a validation count, which utilizes fewer resources. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An audience measurement computing system comprising:

at least one processor;

a non-transitory computer-readable medium having stored therein instructions that, upon execution by the at least one processor, cause the audience measurement computing system to perform operations comprising:

collecting a signature, wherein the signature is associated with a presentation of unidentified media being presented to a plurality of locations;

determining that the signature does not match reference signatures in a reference signature database;

identifying, based on the determining that the signature does not match the reference signatures in the reference signature database, that the signature is associated with metadata, wherein the metadata includes media identifying information related to the unidentified media;

determining that the signature matches a preliminary signature in a preliminary signature database, different than the reference signature database;

increasing, based on the determining that the signature matches the preliminary signature in the preliminary signature database, a count associated with the preliminary signature;

determining that the count associated with the preliminary signature satisfies a count threshold; and storing, based on the determining that the count satisfies the count threshold, the preliminary signature as a new reference signature in the reference signature database.

2. The audience measurement computing system of claim 1, wherein the signature is a first signature obtained from a first location, and wherein the operations further comprise:

collecting a second signature obtained from a second location, wherein the second signature is associated with another presentation of unidentified media being presented at the second location;

determining that the second signature does not match reference signatures in the reference signature database;

determining that the second signature does not include metadata;

determining that the second signature does not match unidentified signatures in an unknown signature database, wherein the unknown signature database comprises signatures that do not include media identifying information; and updating the unknown signature database by storing the second signature in the unknown signature database as a signature associated with the unidentified media.

3. The audience measurement computing system of claim 1, wherein the signature is a first signature obtained from a first location, and wherein the operations further comprise:

collecting a second signature obtained from a second location, wherein the second signature is associated with another presentation of unidentified media being presented at the second location;

determining that the second signature does not match reference signatures in the reference signature database;

determining that the second signature does not include metadata;

determining that the second signature does match an unidentified signature in an unknown signature database, wherein the unknown signature database comprises signatures that do not include media identifying information; and updating a count associated with the unidentified signature.

4. The audience measurement computing system of claim 3, determining that the second signature includes a different portion of the unidentified media than the unidentified signature;

expanding the unidentified signature to include the different portion; and storing the expanded unidentified signature as the unidentified signature.

5. The audience measurement computing system of claim 1, wherein the operations further comprise:

prior to determining that the count satisfies the count threshold, receiving additional signatures that match preliminary signature; and for each of the received additional signatures, responsive to determining that the additional signature matches the preliminary signature, increasing the count associated with the preliminary signature.

6. The audience measurement computing system of claim 5, wherein the operations further comprise:

identifying, using the metadata, media content of the unidentified media; and crediting impressions of the media content based on the count.

7. The audience measurement computing system of claim 1, the operations further comprising:

associating the metadata identifying the unidentified media with the new reference signature in the reference signature database.

8. The audience measurement computing system of claim 6, the operations further comprising:

identifying, using the metadata, media content of the unidentified media, wherein the media content is from an over-the-top provider; and crediting, based on the count, the media content.

9. A method comprising:

collecting a signature, wherein the signature is associated with a presentation of unidentified media being presented to a plurality of locations;

determining that the signature does not match reference signatures in a first signature database;

identifying, based on the determining that the signature does not match the reference signatures in the first signature database, that the signature is associated with metadata, wherein the metadata includes media identifying information related to the unidentified media;

determining that the signature matches a preliminary signature in a second signature database, different than the first signature database;

increasing, based on the determining that the signature matches the preliminary signature in the second signature database, a count associated with the preliminary signature;

determining that the count associated with the preliminary signature satisfies a count threshold; and storing, based on the determining that the count satisfies the count threshold, the preliminary signature as a new reference signature in the first signature database.

10. The method of claim 9, further comprising:

determining that the preliminary signature matches an unidentified signature in a third reference database, wherein the third reference database comprises signatures that do not include media identifying information.

11. The method of claim 10, further comprising:

updating the count associated with the preliminary signature based on a count associated with the unidentified signature in the third reference database.

12. The method of claim 9, further comprising:

prior to determining that the count satisfies the count threshold, receiving additional signatures that match preliminary signature; and for each of the received additional signatures, responsive to determining that the additional signature matches the preliminary signature, increasing the count associated with the preliminary signature.

13. The method of claim 12, further comprising:

associating the metadata identifying the unidentified media with the new reference signature in the first signature database;

identifying, using the metadata, media content of the unidentified media; and crediting, based on the count, the media content.

14. The method of claim 13, wherein the media content is from an over-the-top provider.

15. A non-transitory computer-readable storage medium, having stored thereon program instructions that, upon execution by a processor, cause performance of a set of operations comprising:

collecting a signature, wherein the signature is associated with a presentation of unidentified media being presented to a plurality of locations;

determining that the signature does not match reference signatures in a first signature database;

identifying, based on the determining that the signature does not match the reference signatures in the first signature database, that the signature is associated with metadata, wherein the metadata includes media identifying information related to the unidentified media;

determining that the signature matches another signature in a second signature database, different than the first signature database;

increasing, based on the determining that the signature matches the other signature in the second signature database, a count associated with the other signature;

determining that the count associated with the other signature satisfies a count threshold; and storing, based on the determining that the count satisfies the count threshold, the other signature as a new reference signature in the first signature database.

16. The non-transitory computer-readable storage medium of claim 15, the set of operations further comprising:

prior to determining that the count satisfies the count threshold, receiving additional signatures that match the other signature; and for each of the received additional signatures, responsive to determining that the additional signature matches the other signature, increasing the count associated with the other signature.

17. The non-transitory computer-readable storage medium of claim 15, the set of operations further comprising:

determining that the other signature matches an unidentified signature in a third reference database, wherein the third reference database comprises signatures that do not include media identifying information.

18. The non-transitory computer-readable storage medium of claim 17, the set of operations further comprising:

updating the count associated with the other signature based on a count associated with the unidentified signature in the third reference database.

19. The non-transitory computer-readable storage medium of claim 16, the set of operations further comprising:

associating the metadata identifying the unidentified media with the new reference signature in the first signature database; and identifying, using the metadata, media content of the unidentified media.

20. The non-transitory computer-readable storage medium of claim 19, the set of operations further comprising:

crediting, based on the count, the media content.

* * * * *